US012752402B2

(12) United States Patent
Yoshimura

(10) Patent No.: US 12,752,402 B2
(45) Date of Patent: Oct. 6, 2026

(54) TOGGLE CLAMP

(71) Applicant: FORWARD CO., LTD., Aichi (JP)

(72) Inventor: Masayuki Yoshimura, Aichi (JP)

(73) Assignee: FORWARD CO., LTD., Aichi (JP)

( * ) Notice: Subject to any disclaimer, the term of this patent is extended or adjusted under 35 U.S.C. 154(b) by 294 days.

(21) Appl. No.: 18/696,652

(22) PCT Filed: Sep. 7, 2022

(86) PCT No.: PCT/JP2022/033599
§ 371 (c)(1),
(2) Date: Mar. 28, 2024

(87) PCT Pub. No.: WO2023/053878
PCT Pub. Date: Apr. 6, 2023

(65) Prior Publication Data

US 2024/0391059 A1 Nov. 28, 2024

(30) Foreign Application Priority Data

Sep. 30, 2021 (JP) ................................ 2021-162293

(51) Int. Cl.
*B25B 5/12* (2006.01)
*B23Q 3/06* (2006.01)

(52) U.S. Cl.
CPC ................ *B25B 5/12* (2013.01); *B23Q 3/069* (2013.01); *B25B 5/122* (2013.01)

(58) Field of Classification Search
CPC .. B25B 5/04; B25B 5/12; B25B 5/127; B25B 5/122; B23Q 3/06; B23Q 3/069
See application file for complete search history.

(56) References Cited

U.S. PATENT DOCUMENTS

| | | | | |
|---|---|---|---|---|
| 5,496,530 | A | 3/1996 | Vannby et al. | |
| 5,688,014 | A | 11/1997 | Kot | |
| 2006/0208408 | A1* | 9/2006 | Migliori | B25B 5/087 269/32 |
| 2008/0179804 | A1 | 7/2008 | McIntosh et al. | |
| 2010/0148414 | A1 | 6/2010 | Poole et al. | |
| 2017/0203412 | A1* | 7/2017 | Grobbel | B25B 5/06 |

FOREIGN PATENT DOCUMENTS

| | | | | |
|---|---|---|---|---|
| EP | 0596808 | A1 * | 5/1994 | B25B 5/122 |
| JP | H07-033422 | A | 2/1995 | |
| JP | H09-136230 | A | 5/1997 | |
| JP | H11-207641 | A | 8/1999 | |
| JP | 2012-505765 | A | 3/2012 | |

* cited by examiner

*Primary Examiner* — Christopher J. Besler
(74) *Attorney, Agent, or Firm* — Paratus Law Group, PLLC

(57) ABSTRACT

The workspace is sufficiently secured while controlling the occupied space. A toggle clamp includes: an actuator capable of linear reciprocating movement of a first shaft; a base plate having an arc-shaped long hole in which the first shaft is slidably fitted; a clamp arm; a base member that rotatably supports the base plate via a second shaft and rotatably supports the clamp arm via a third shaft; and a link member rotatably connected to the clamp arm via a fourth axis and rotatably connected to the base plate via a fifth shaft. In the released state, the fourth shaft is located away from a straight line connecting respective axis centers of the second and fifth shafts. In the fixed state, the fourth shaft is located on a straight line connecting the second and fifth shafts.

2 Claims, 5 Drawing Sheets

[Fig. 1]
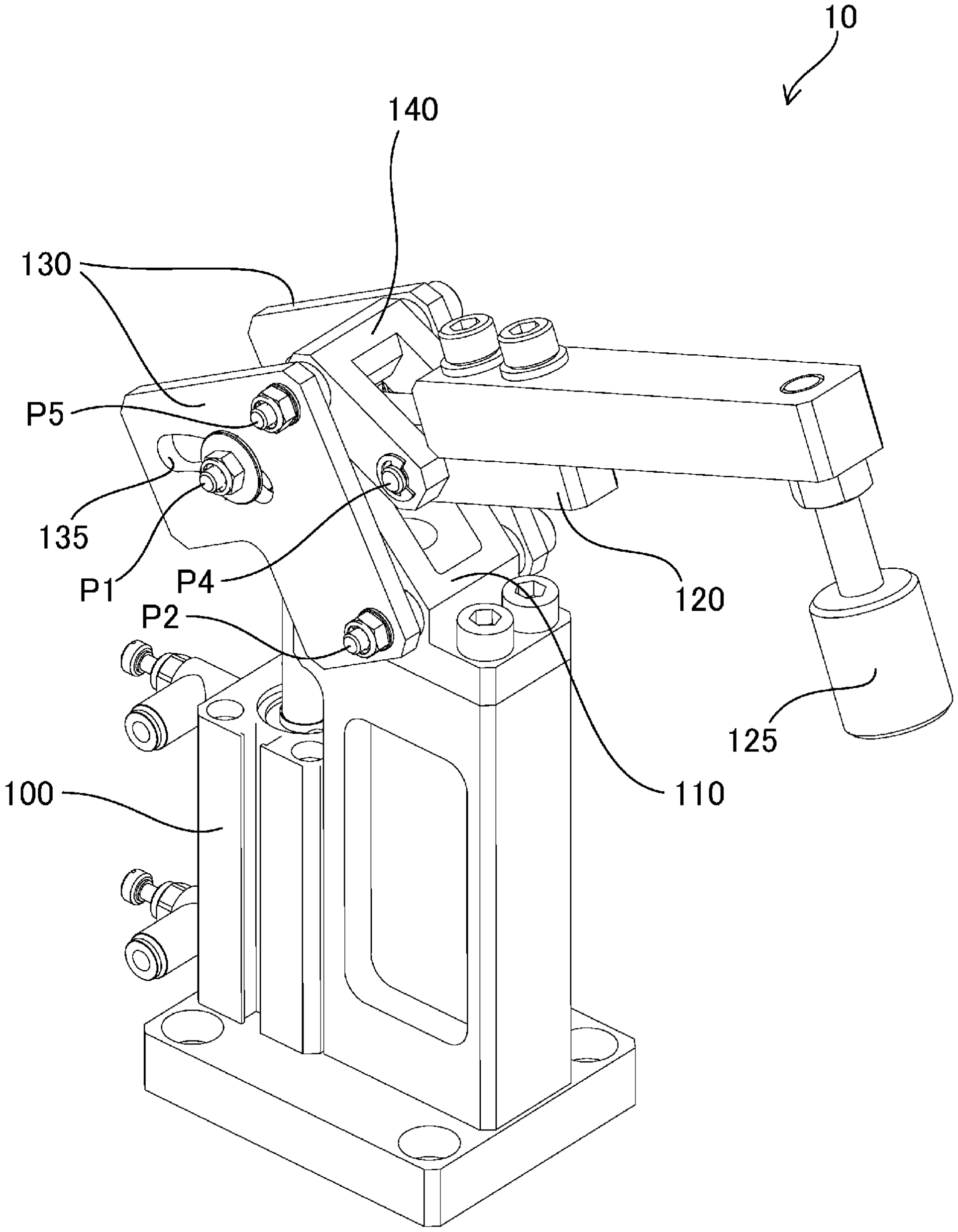

[Fig. 2]
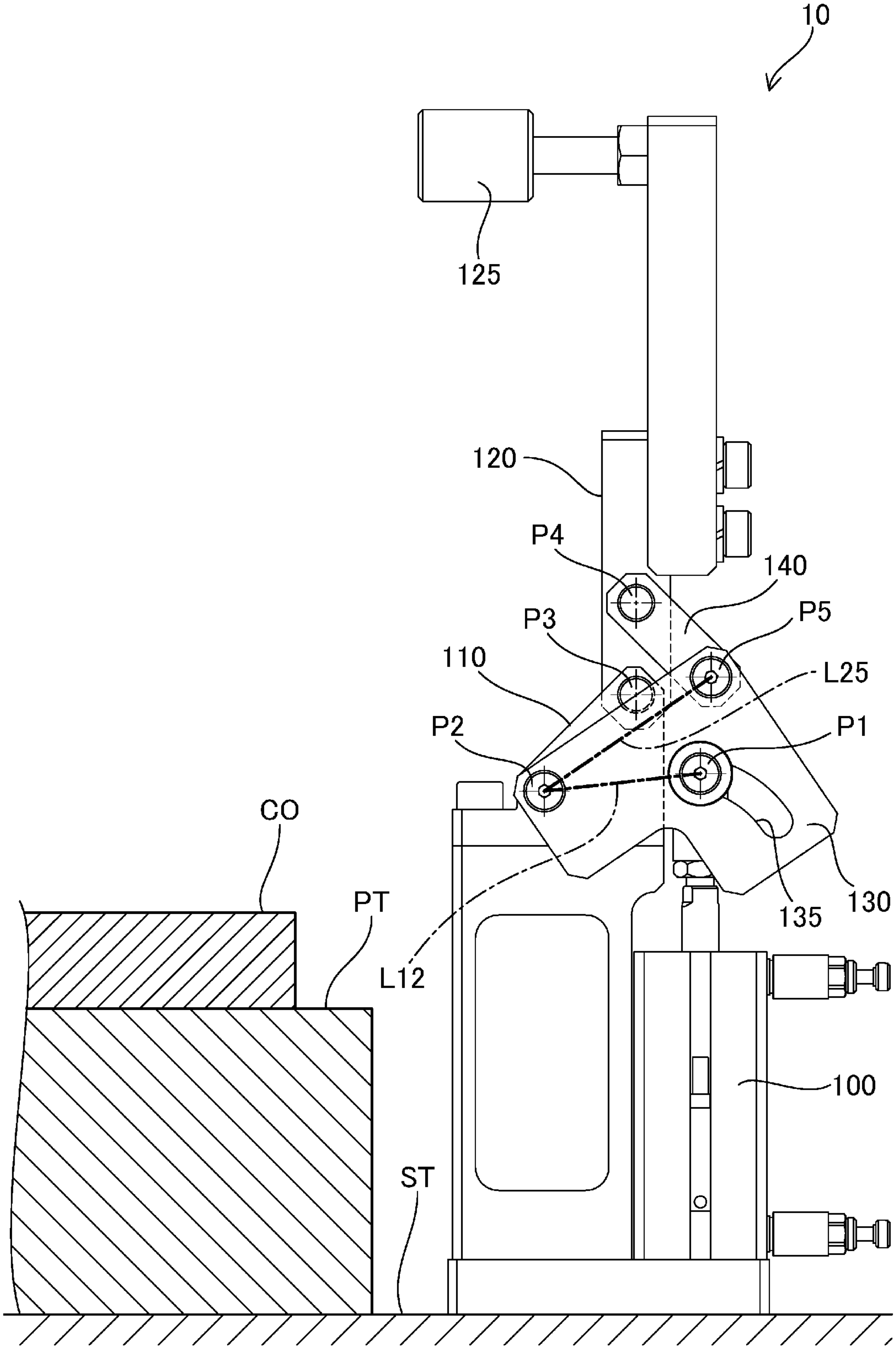

[Fig. 3]
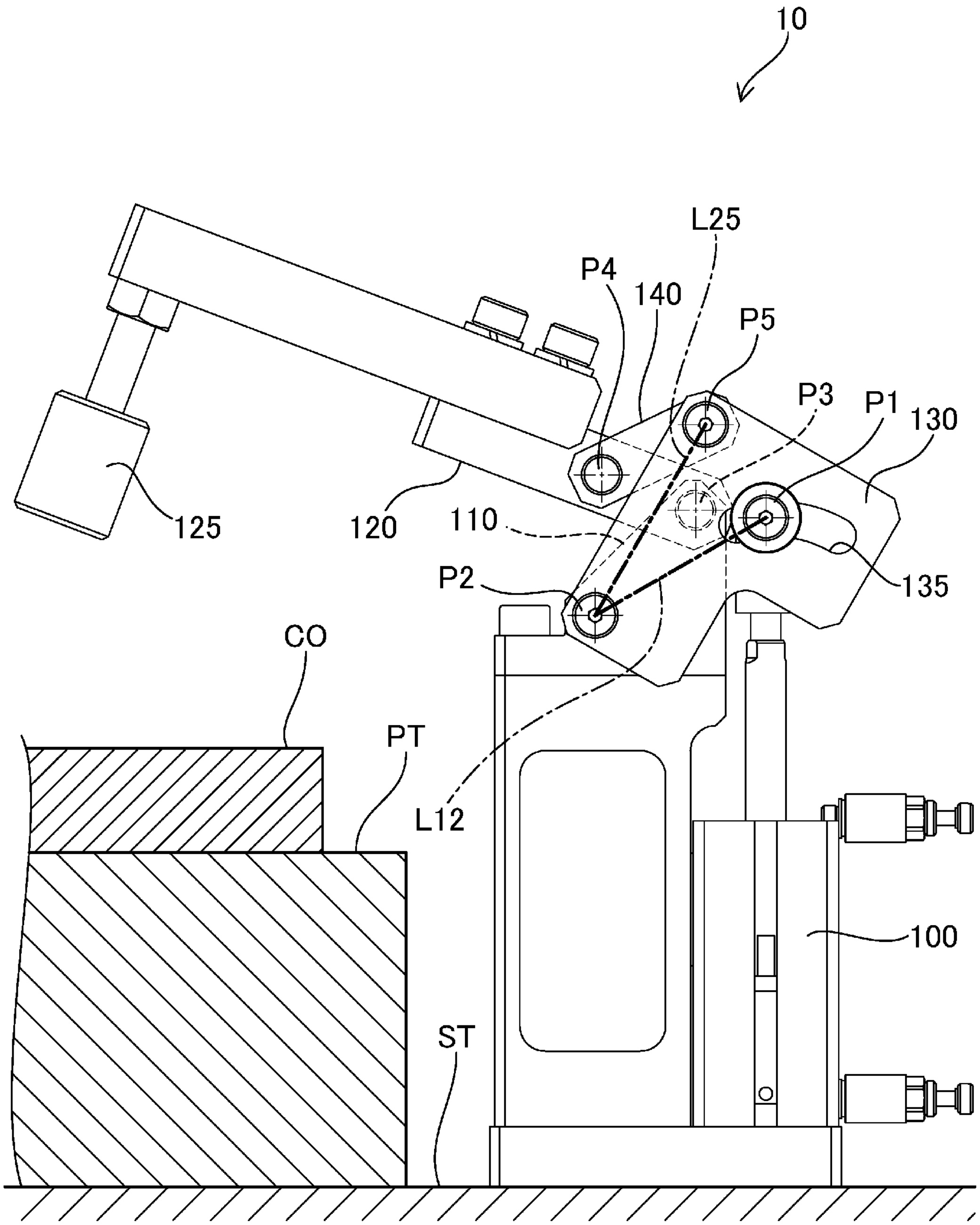

[Fig. 4]
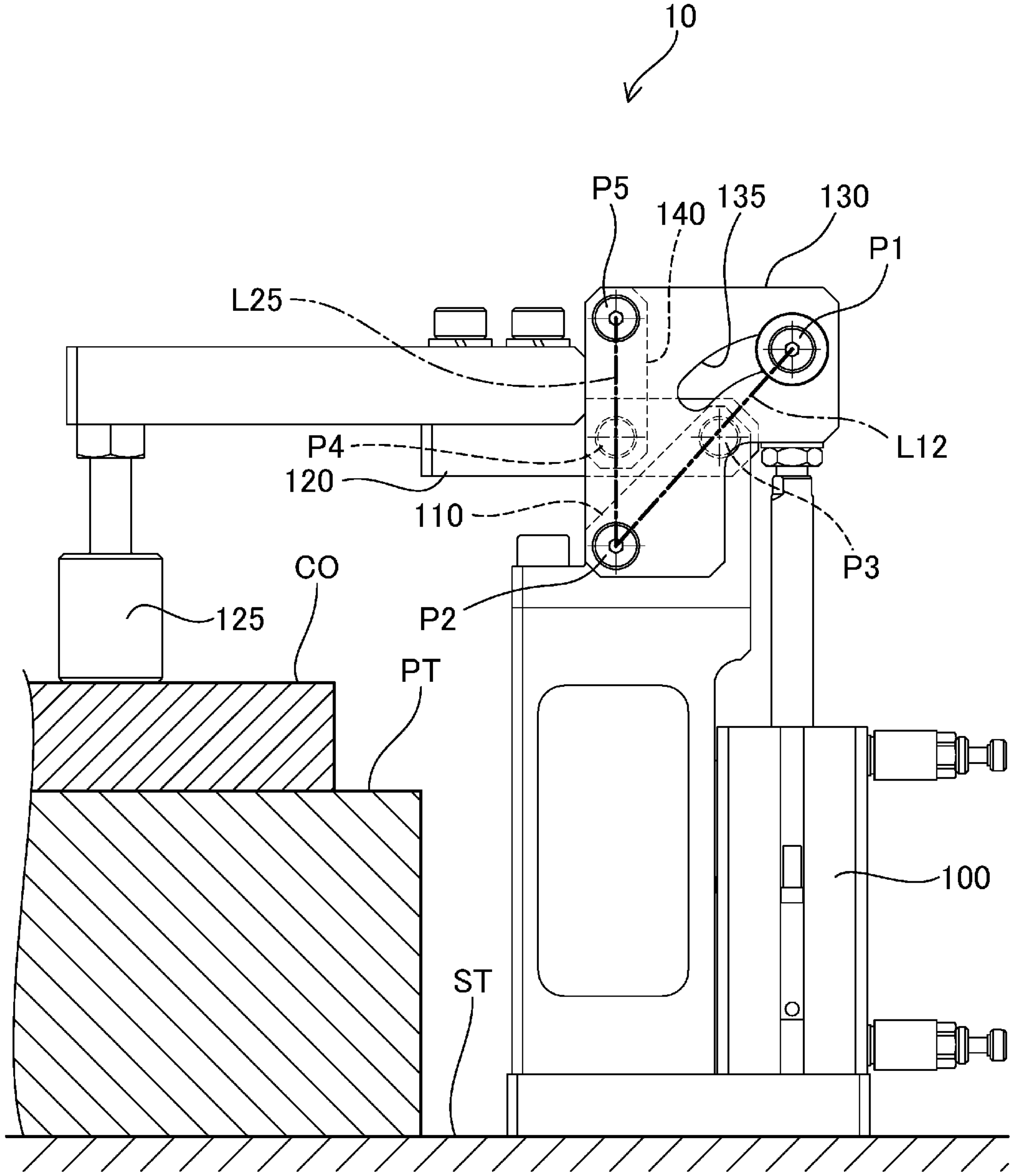

[Fig. 5]
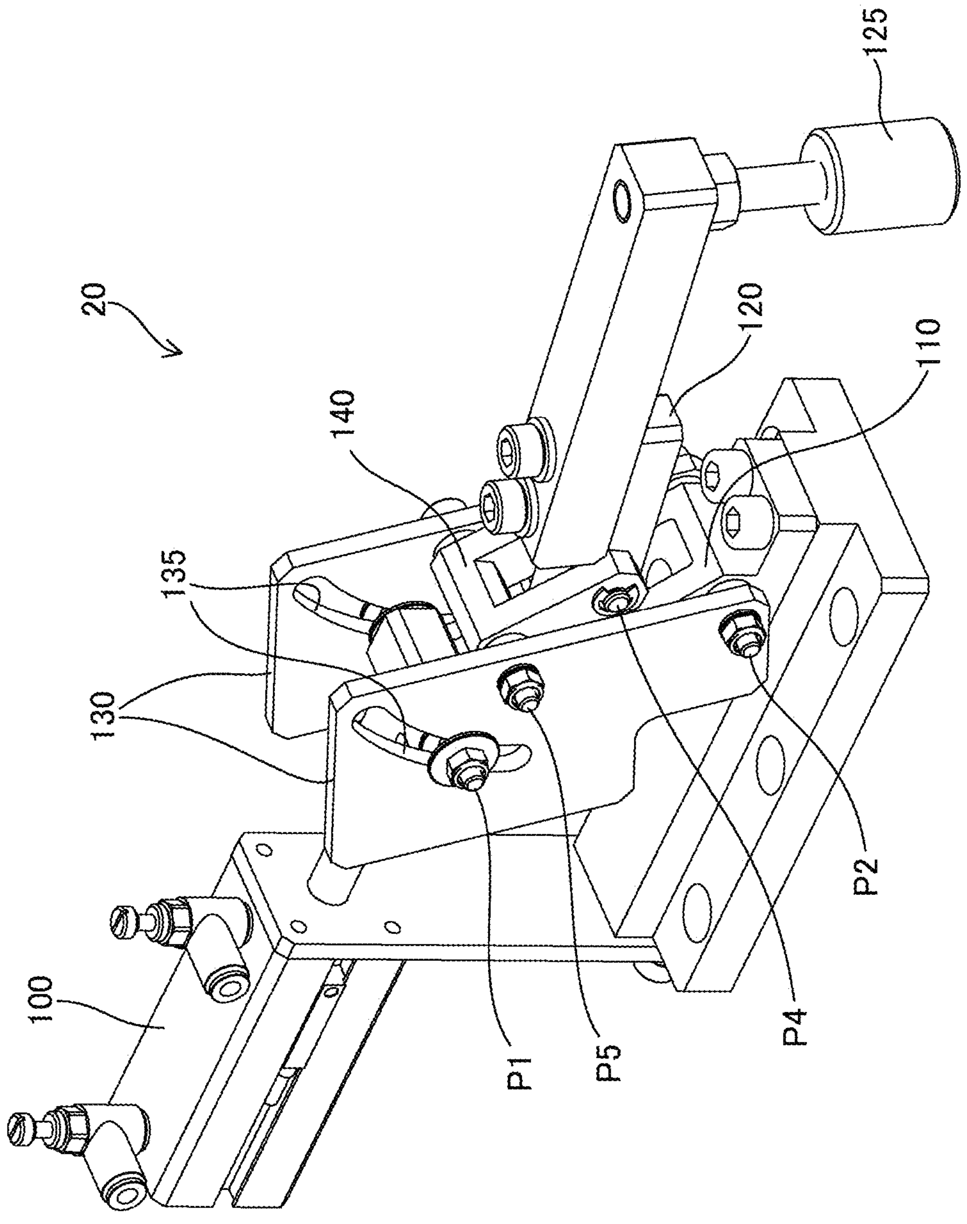

TOGGLE CLAMP

CROSS REFERENCE TO PRIOR APPLICATION

This application is a National Stage Patent Application of PCT International Patent Application No. PCT/JP2022/033599 (filed on Sep. 7, 2022) under 35 U.S.C. § 371, which claims priority to Japanese Patent Application No. 2021-162293 (filed on Sep. 30, 2021), which are all hereby incorporated by reference in their entirety.

TECHNICAL FIELD

This description discloses techniques for toggle clamping.

BACKGROUND ART

Toggle clamps use a toggle mechanism to detachably secure clamped objects. PTL 1 discloses a manual toggle clamp. PLT 2 discloses an actuator-driven toggle clamp.

CITATION LIST

Patent Literature

PLT 1: JP 2012-505765 A
PLT 2: JP 7-33422 A

SUMMARY OF INVENTION

Technical Problem

In actuator-driven toggle clamps, there was room for improvement from the viewpoint of securing sufficient working space for attaching and detaching clamped objects while controlling the space occupied by the clamp itself.

Solution to Problem

The technology disclosed herein can be realized as the following forms.

(1) One form disclosed herein is a toggle clamp for detachably securing a clamping object using a toggle mechanism. This toggle clamp includes: an actuator configured to allow linear reciprocating movement of a first shaft in a direction orthogonal to the first shaft; a base plate having an arc-shaped long hole in which the first shaft is slidably fitted; a clamp arm having a clamping action portion for pressing the clamping object; a base member rotatably supporting the base plate via a second shaft, and rotationally supporting the clamp arm via a third shaft; and a link member rotatably connected to the clamp arm via a fourth shaft located away from the third shaft toward the clamping action portion, and rotationally connected to the base plate via a fifth shaft. When the clamping action part is in the released state in which the clamping object can be released, the fourth shaft is located away from the clamping action portion from a straight line connecting respective axial centers of the second shaft and the fifth shaft, and when the clamping action part is in the fixed state in which the clamping object can be fixed, the fourth shaft is located on a straight line connecting respective axial centers of the second shaft and the fifth shaft.

When the clamping action part is in the released state in which the clamping object can be released, the third shaft may be located away from the clamping action portion from a straight line connecting respective axial centers of the first shaft and second shaft, and when the clamping action portion is in the fixed state in which the clamping object can be fixed, the third shaft may be located on a straight line connecting respective axial centers of the first shaft and the second shaft.

According to this form of the toggle clamp, the toggle mechanism configured via the second shaft, fourth shaft, and fifth shaft can improve the clamping pressure to secure the clamped object. In addition, the toggle clamp itself can be controlled in terms of the space it occupies, while still providing sufficient working space for attaching and detaching the clamped object.

The technology disclosed herein can be realized in various forms different from the toggle clamp. For example, the technology disclosed herein can be realized in the form of the toggle clamp, a toggle clamp component, a device equipped with the toggle clamp, and a manufacturing method using the toggle clamp.

BRIEF DESCRIPTION OF DRAWINGS

FIG. 1 is a diagram showing a toggle clamp.

FIG. 2 is a right-side view of the toggle clamp in the released state.

FIG. 3 is a right-side view of the toggle clamp in the middle state.

FIG. 4 is a right-side view of the toggle clamp in a fixed state.

FIG. 5 is a diagram showing a toggle clamp of the second embodiment.

DESCRIPTION OF EMBODIMENTS

A. First Embodiment

FIG. 1 is a diagrammatic view of a toggle clamp 10. FIG. 2 is a right-side view showing the toggle clamp 10 in the released state. FIG. 3 is a right-side view of the toggle clamp 10 in the midway state. FIG. 4 is a right-side view showing the toggle clamp 10 in a fixed state.

The toggle clamp 10 is a device for detachably securing a clamping object CO using a toggle mechanism to. The toggle clamp 10 is configured to be fixed to an installation surface ST. The toggle clamp 10 secures the clamped object CO to a mounting platform PT by pressing the clamped object CO placed on the mounting platform PT against the mounting platform PT. The state shown in FIG. 2 is the state in which the toggle clamp 10 releases the fixation of the clamped object CO and opens fully. The state shown in FIG. 3 is halfway between the state shown in FIG. 2 and the state shown in FIG. 4. The state shown in FIG. 4 is the state in which the toggle clamp 10 has secured the clamped object CO.

The toggle clamp 10 has an actuator 100, a base member 110, a clamp arm 120, a base plate 130, and a link member 140. The toggle clamp 10 has a pin P1, a pin P2, a pin P3, a pin P4, and a pin P5 as shafts connecting each member. The main components of the toggle clamp 10 are made of metal.

The actuator 100 of the toggle clamp 10 is configured to allow linear reciprocating movement of the pin P1 in a direction perpendicular to the axis center of the pin P1. In this embodiment, the actuator 100 is configured to allow vertical reciprocating movement of the pin P1. In this embodiment, the drive system of the actuator 100 is pneumatic, but in other embodiments, it may be other drive systems such as electric or hydraulic.

The base member 110 of the toggle clamp 10 rotatably supports the base plate 130 via the pin P2, and rotatably supports the clamp arm 120 via the pin P3.

The clamp arm 120 of the toggle clamp 10 has a clamping action portion 125 that presses the clamping object CO. In this embodiment, the clamping action portion 125 presses the clamping object CO downwardly onto the mounting platform PT. The clamping action portion 125 is provided at one end of the clamp arm 120. The other end of the clamp arm 120 is rotatably supported by the base member 110 via the pin P3.

The base plate 130 of the toggle clamp 10 is a plate-shaped member, and in this embodiment is a pair of members that sandwich the base member 110 and the link member 140 between them. The base plate 130 has an arc-shaped long hole 135 into which the pin 1 is slidably fitted. The arc-shaped long hole 135 is formed so that the pin P1 moves on a straight line passing through the center of the arc of the arc-shaped long hole 135 in each of the states shown in FIGS. 2 to 4. The base plate 130 is configured to be rotatable about the pin P2 as the pin 1 slides in the arcuate long hole 135.

The link member 140 of the toggle clamp 10 connects the clamp arm 120 to the base plate 130. The link member 140 is rotatably connected to the clamp arm 120 via the pin P4, which is located away from the pin P3 toward the clamping action portion 125. Link member 140 is rotatably connected to base plate 130 via the pin P5.

As shown in FIGS. 2 and 3, when the clamping action portion 125 is in the released state in which the clamping object CO can be released, the pin P3 is at a position away from a straight line L12 connecting the respective axis centers of the pins P1 and P2 toward the clamping action portion 125. At that time, the pin P4 is in a position away from a straight line L25 connecting the respective axial centers of the pin P2 and the pin P5 toward the clamping action portion 125.

As shown in FIG. 4, when the clamping action portion 125 is in a fixed state in which the clamping object CO can be fixed, the pin P3 is in a position on the straight line L12 connecting the respective axial centers of the pins P1 and P2. In that case, the pin P4 is in the position on the straight line L25 connecting the respective axial centers of the pin P2 and the pin P5. In this embodiment, in the fixed state of FIG. 4, the axis center of the pin P3 is in a position beyond the straight line L12 to the opposite side of the clamping action portion 125, but in other embodiments, it may be in a position closer to or on the straight line L12 than in the open state of FIGS. 2 and 3. In this embodiment, the axis center of the pin P4 is located on the straight line L25 in the fixed state of FIG. 4, but in other embodiments, it may be closer to the straight line L25 than in the open state of FIGS. 2 and 3 or beyond the straight line L25 to the opposite side of clamping action portion 125.

According to the first embodiment described above, the toggle mechanism configured via the pin P2, the pin P4, and the pin P5 can improve the clamping pressure to secure the clamped object CO. In addition, a sufficient working space can be secured when attaching and detaching the clamped object CO while controlling the space occupied by the toggle clamp 10 itself.

B. Second Embodiment

FIG. 5 is a diagram of a toggle clamp 20 of the second embodiment. The toggle clamp 20 of the second embodiment is similar to the toggle clamp 10 of the first embodiment except that the actuator 100 is arranged differently, the pin P1 moves back and forth in the horizontal direction, and the base member 110 and base plate 130 are shaped differently to match the pin P1 that moves in the horizontal direction.

According to the second embodiment, as in the first embodiment, the toggle mechanism configured via the pin P2, the pin P4, and the pin P5 can improve the clamping pressure to secure the clamped object CO. In addition, a sufficient working space can be secured when attaching and detaching the clamped object CO while controlling the space occupied by the toggle clamp 10 itself.

C. Other Embodiments

The technology disclosed herein is not limited to the above-described embodiments, examples, and variations, but can be realized in various configurations to the extent that the intent is not departed from. For example, among the technical features in the above-described embodiments, examples, and variations, those corresponding to the technical features in each of the forms described in the Summary of the Invention section may be replaced or combined as appropriate to solve some or all of the above-described problems or to achieve some or all of the above-described effects. combination as appropriate to solve some or all of the above-mentioned issues or to achieve some or all of the above-mentioned effects. Also, technical features not described as essential in this specification can be deleted as appropriate.

The direction of movement of the pin P1 is not limited to the vertical or horizontal direction, but may be inclined with respect to the horizontal direction. The direction in which the clamping action portion 125 presses the clamping object CO is not limited to downward, but may be upward or horizontal. When the clamping action portion 125 is in a fixed state in which the clamping object CO can be fixed, the pin P3 may be on the straight line L12 connecting the respective axes of the pins P1 and P2, may be further away from the straight line L12 toward the clamping action portion 125, or may be beyond the straight line L25 on the opposite side from the clamping action portion 125.

REFERENCE SIGNS LIST

1 . . . pin
10, 20 . . . Toggle clamp
100 . . . Actuator
110 . . . Base member
120 . . . Clamp arm
125 . . . Clamping action portion
130 . . . Base plate
135 . . . Arc-shaped long hole
140 . . . Link member
CO . . . Clamping object
L12 . . . Straight line
L25 . . . Straight line
P1 . . . Pin
P2 . . . Pin
P3 . . . Pin
P4 . . . Pin
P5 . . . Pin
PT . . . Placement platform
ST . . . Installation surface

The invention claimed is:

1. A toggle clamp for detachably securing a clamped object using a toggle mechanism, the toggle clamp comprising:

an actuator configured for linear reciprocating movement of a first shaft in a direction orthogonal to the first shaft;

a base plate having an arc-shaped long hole in which the first shaft is slidably fitted;

a clamp arm having a clamping action portion provided at one end of the clamp arm, the clamping action portion being configured to press against the clamped object;

a base member that rotatably supports the base plate via a second shaft and rotatably supports the clamp arm via a third shaft; and a link member that is rotatably connected to the clamp arm via a fourth shaft located away from the third shaft toward the clamping action portion, and rotatably connected to the base plate via a fifth shaft, wherein the base plate, the clamp arm, the base member and the link member together constitute the toggle mechanism, wherein, when the clamping action portion is in a released state in which the clamped object is releasable, the fourth shaft is located away from a first straight line connecting respective axis centers of the second shaft and the fifth shaft toward the clamping action portion, and wherein when the clamping action portion is in a fixed state in which the clamped object is fixable, the fourth shaft is located on the first straight line connecting respective axis centers of the second shaft and the fifth shaft.

2. The toggle clamp according to claim 1, wherein, when the clamping action portion is in the released state in which the clamped object is releasable, the third shaft is located away from a second straight line connecting respective axis centers of the first shaft and the second shaft toward the clamping action portion, and wherein when the clamping action portion is in the fixed state in which the clamped object is fixable, the third shaft is located on the second straight line connecting respective axis centers of the first shaft and the second shaft.

* * * * *